(12) United States Patent
Van Der Horst et al.

(10) Patent No.: US 12,135,441 B2
(45) Date of Patent: Nov. 5, 2024

(54) LENTICULAR LENS WITH A GRADIENT

(71) Applicant: ZHANGJIAGANG KANGDE XIN OPTRONICS MATERIAL CO. LTD, Zhangjiagang (CN)

(72) Inventors: Jan Van Der Horst, Veldhoven (NL); Silvino Jose Antuna Presa, Veldhoven (NL); Bas Koen Böggemann, Veldhoven (NL)

(73) Assignee: ZHANGJIAGANG KANGDE XIN OPTRONICS MATERIAL CO., LTD., Jiangsu (CN)

( * ) Notice: Subject to any disclaimer, the term of this patent is extended or adjusted under 35 U.S.C. 154(b) by 632 days.

(21) Appl. No.: 17/419,343

(22) PCT Filed: Dec. 30, 2019

(86) PCT No.: PCT/CN2019/129916
§ 371 (c)(1),
(2) Date: Jun. 29, 2021

(87) PCT Pub. No.: WO2020/140867
PCT Pub. Date: Jul. 9, 2020

(65) Prior Publication Data
US 2022/0075205 A1 Mar. 10, 2022

(30) Foreign Application Priority Data
Dec. 30, 2018 (NL) .................................. 2022328

(51) Int. Cl.
*G02B 30/29* (2020.01)
*H04N 13/305* (2018.01)
(52) U.S. Cl.
CPC ........... *G02B 30/29* (2020.01); *H04N 13/305* (2018.05)

(58) Field of Classification Search
CPC ........ G02B 30/29; G02B 30/27; G02B 30/00; G02B 30/20; G02B 30/28; G02B 30/0068;
(Continued)

(56) References Cited

U.S. PATENT DOCUMENTS

| | | | |
|---|---|---|---|
| 2011/0164036 A1* | 7/2011 | De Zwart | H04N 13/305 345/419 |
| 2015/0219304 A1* | 8/2015 | Piehler | G02B 19/0014 362/333 |
| 2018/0231694 A1* | 8/2018 | Ma | G02B 5/201 |

FOREIGN PATENT DOCUMENTS

| | | |
|---|---|---|
| CN | 1737638 A | 2/2006 |
| CN | 1841129 A | 10/2006 |
| CN | 102047169 A | 5/2011 |
| CN | 102265191 A | 11/2011 |

(Continued)

OTHER PUBLICATIONS

Algorri et al (Tunable liquid crystal multifocal microlens array, Nature, Scientific Reports, 7:17318, p. 1-6, Date: Dec. 11, 2017) (Year: 2017).*

(Continued)

*Primary Examiner* — Jennifer D. Carruth
*Assistant Examiner* — Jyotsna V Dabbi
(74) *Attorney, Agent, or Firm* — Samson G. Yu

(57) ABSTRACT

A lenticular lens having an array of elongate lenticular elements extending parallel to one another, the array having a first edge and a second edge extending parallel to the elongate lenticular elements; and a central line that is centered between the first edge and the second edge; characterized in that the focal length of the lenticular elements gradually decreases from the first edge of the array towards the central line as well as from the second edge of the array towards the central line. This improves the angular perfor- (Continued)

mance of the lenticular lens, so that at short viewing distances the image quality near the edges of the display is not impaired.

12 Claims, 2 Drawing Sheets

(58) Field of Classification Search
CPC .. G02B 3/0006; G02B 3/0037; G02B 3/0043; G02B 3/005; G02B 3/0087; G02B 3/0012; G02B 27/0172; G02B 27/10; G02B 27/283; H04N 13/305; H04N 13/302; G03B 25/02; B42D 25/324; B42D 25/29; G02F 1/133526; G02F 1/29; G02F 1/294
USPC ...... 359/462–464, 466; 348/42–60; 353/7–9; 349/8–9, 15
See application file for complete search history.

(56) References Cited

FOREIGN PATENT DOCUMENTS

| CN | 102323687 A | | 1/2012 |
|---|---|---|---|
| CN | 202177749 U | * | 3/2012 |
| CN | 102566046 A | | 7/2012 |
| CN | 102749714 A | | 10/2012 |
| EP | 2515158 A | | 10/2012 |
| JP | H08254757 A | | 10/1996 |
| WO | 2009147588 A | | 12/2009 |

OTHER PUBLICATIONS

Park et al (Liquid crystal Lens array with thermally controllable focal length and electrically convertible lens type, J. Op. Soc, Korea, vol. 19, 1, pp. 88-94, Date: Feb. 25, 2015) (Year: 2015).*
Corresponding CN first search report issued on Aug. 26, 2022.

* cited by examiner

LENTICULAR LENS WITH A GRADIENT

TECHNICAL FIELD

The disclosure relates to a lenticular lens and to an autostereoscopic display device comprising such lenticular lens.

BACKGROUND

Autostereoscopic displays have attracted great attention in the last two decades. In one approach, a display having rows and columns of pixels is integrated with a lenticular lens stack. Such stack is typically formed by an array of semi-cylindrical micro-lenses commonly designated as lenticular elements or lenticulars (the array is then often indicated as a lenticular lens or a lenticular device). Each lenticular is then associated with a group of at least two columns of pixels that extend parallel with the lens, or under an angle thereto. The focusing effect of each lenticular makes it possible to direct the output from different pixel columns to different spatial positions in front of the display. This allows the emittance of images specifically intended for the left eye and of images specifically intended for the right eye, which makes it possible that a stereoscopic image is perceived by a viewer.

Generally, when a display is viewed by a viewer in front of the display, the viewing angle is not the same for each position on the display. For many displays this does not affect the image quality of the display. However, for autostereoscopic displays that are based on a lenticular lens, problems are encountered by variations in the viewing angle. This is because the focus of a lenticular element does not move in one and same plane when the angle of incident (and egressing) light rays varies. This means that the focus does not coincide with the plane of the pixel display over the entire range of viewing angles, as is illustrated in FIG. 1. Generally, at smaller viewing angles (i.e. with larger deviations from the normal to the display), the focus moves to a position between the pixel display and the lenticular lens (i.e. closer to the lens). This effect is small at large viewing distances from the display since light rays are almost parallel, leading to a small variation in viewing angles. At short distances, however, viewing angles with the edges of the display exhibit a great deviation from the normal of the display. A viewer will then experience an inferior image quality, and in particular an increased crosstalk (i.e. light that is specifically intended for one of the eyes is observed by the other eye).

SUMMARY

It is therefore an objective of the disclosure to provide an autostereoscopic display with an improved angular performance, so that at short viewing distances the image quality near the edges of the display is not impaired (or at least less impaired than is the case with longer viewing distances). In particular, it is an objective that there is no increased crosstalk in such case.

It has now been found that one or more of these objectives can be reached by a particular design of the lenticular lens.

Accordingly, the present disclosure relates to a lenticular lens for use in an autostereoscopic display device, the lens comprising an array of elongate lenticular elements extending parallel to one another, the array comprising a first edge and a second edge extending parallel to the elongate lenticular elements;

a central line that is centered between the first edge and the second edge;

wherein the elongate lenticular elements have a length, which is the distance between their two ends;

a middle, which is centered between the two ends;

a focal length, which allows the elements to converge or diverge light;

characterized in that the focal length of the lenticular elements gradually decreases from the first edge of the array towards the central line as well as from the second edge of the array towards the central line.

DETAILED DESCRIPTION OF THE EMBODIMENTS

Figure 1:
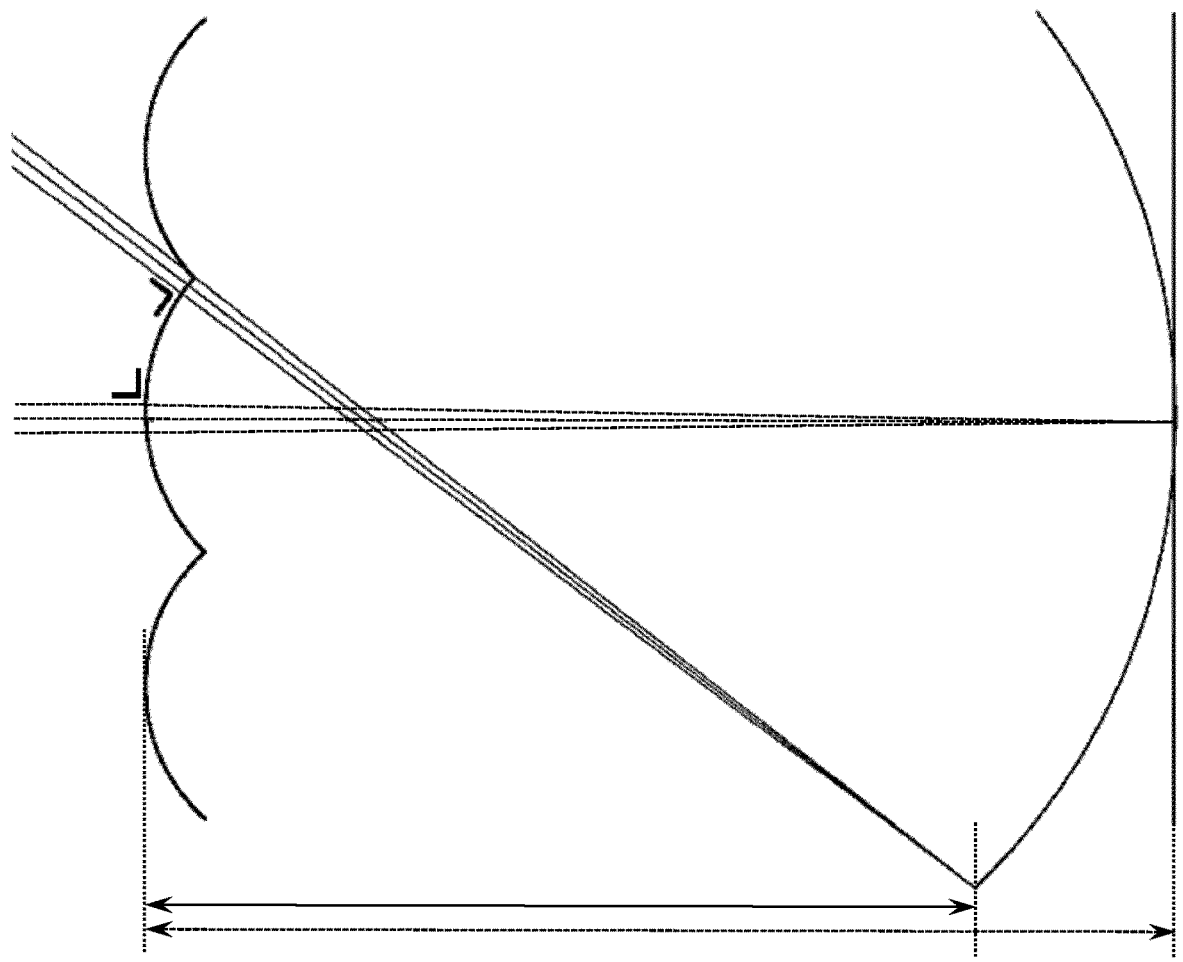
FIG. 1 is a cross-sectional view of how light travels under different angles through a lenticular element known in the art.

In the present description, a decrease or increase of a particular quantity such as focal length, refractive index or curvature, as a function of position on the array of elongate lenticular elements is typically of a gradual (i.e. stepwise) nature. This is because such quantity is constant for a single lenticular element but varies for subsequent lenticular elements, e.g. within particular set of adjacent lenticular elements, each subsequent lenticular element has a slighty increased or decreased focal length, refractive index or curvature. The word gradual(ly) is used throughout this description to express such increase or decrease.

Elements in the figures are illustrated for simplicity and clarity and have not necessarily been drawn to scale. For example, the dimensions of some of the elements in the figures may be exaggerated relative to other elements to help improve understanding of the optical effects of the present disclosure, and provide a clear distinction from lenticular lenses known in the art. Furthermore, the terms "first", "second", and the like herein, if any, are generally used for distinguishing between similar elements and not necessarily for describing a sequential order.

An elongate lenticular element in a lenticular lens of the disclosure has a length, which is the distance between its two ends. Centered between both ends is the middle of the element.

In a lenticular lens of the disclosure, the elongate lenticular elements are stacked parallel to each other to thereby form an array of such elements. Typically, the two most remote elements (i.e. those that have a neighboring element at only one of their sides) form an edge of the array. Therefore, the array has a first edge and a second edge which extend parallel to the elongate lenticular elements. For the purpose of the present disclosure, the terms "the first edge" and "the second edge" of the array may also be used to indicate the corresponding edges of the lenticular lens.

Other edges of the array are defined by the ends of all lenticular elements that are present between the first edge and a second edge. Usually, these other edges are a third edge and a fourth edge that are perpendicular to the first edge and the second edge.

Whereas the first edge and the second edge are straight because the lenticular elements are straight, the third edge and the fourth edge may be curved or straight. When all lenticular elements are of the same length and aligned, the third edge and the fourth edge are straight. In this case, the array (and thus also the lenticular lens) is of a rectangular shape. When neighboring lenticular elements exhibit a gradual variation in their lengths, then the third edge and the fourth edge may be curved edges.

Besides the first edge and the second edge of the array, there is also defined a central line that is centered between these edges, i.e. it runs parallel to these edges. This line typically coincides with one of the symmetry axes of the array when the array is rectangular, and is right in front of a viewer who is viewing the lens in the center of the field of view of the lens (when the lens is present in an autostereoscopic display device). The middle point of this line then coincides with the center of the array.

In a lenticular lens according to the disclosure, the focal length of the different lenticular elements is not the same along any straight line that runs from the center of the array to the first edge of the array or to the second edge of the array. Assuming that the preferred viewer position, when projected on the lens, lies somewhere at the central line (and preferably at the center point thereof), the lenticular lens is designed in such way that the focal length of the lenticular elements gradually decreases from the first edge of the array towards the central line as well as from the second edge of the array towards the central line. The function of this gradual decrease is to eliminate negative effects on the image quality due to the smaller viewing angles that occur near the edges of the lenticular lens-when the lens is part of an autostereoscopic display device.

FIG. 1 is a cross-section of a lenticular element with therein two groups of light rays that deflect according to the optical design of the lenticular element. Each group egresses from a different part of the lenticular surface and each ray egresses perpendicular to the lenticular surface. The rays of the first group (dotted lines) egress normal to the main plane of the array of lenticulars, while the rays of the second group (continuous lines) are oblique with respect to the main plane of the array (small viewing angle). FIG. 1 demonstrates that the focal point for either group of rays is at a different distance from the lenticular surface, as is illustrated by the dotted arrow and the continuous arrow at the bottom the figure. More generally, the focal point follows the curve drawn in FIG. 1 when the egression angle changes from normal to oblique.

Figure 2:
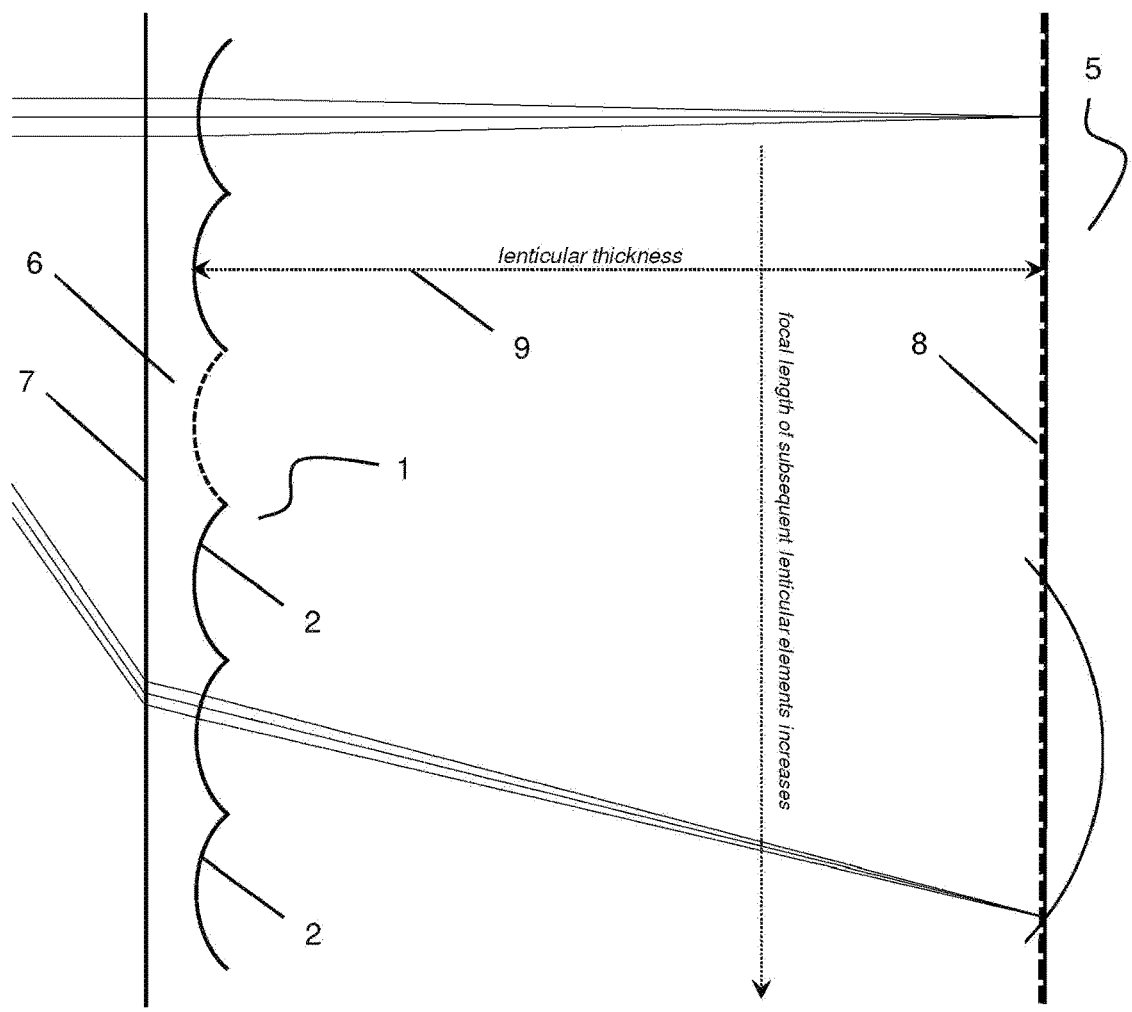
FIG. 2 is a cross-sectional view of a lenticular lens in accordance with the disclosure, which is incorporated in an autostereoscopic display device.

FIG. 2 is a cross-sectional view of a lenticular lens (1) in accordance with the disclosure, wherein the lenticular lens (1) is part of an autostereoscopic display device (5). At the left of the lenticular lens (1), a liquid crystal composition (6) is sandwiched between the lenticular lens (1) and a transparent cover plate (7). At the right of the lenticular lens (1), a pixelated display panel (8) is present. Again, two groups of light rays are drawn. The upper group egresses from the lenticular element (2) under an angle that is normal to the cover plate (7). This situation corresponds to a viewer who is positioned right in front of the particular lenticular element (2). The focal point of this lenticular element (2) coincides with the plane of the pixelated display panel (8), and equals the lenticular thickness (9), which term will be further explained below. The lower group of rays egresses from the lenticular element (2) under an oblique angle to the cover plate (7). This situation corresponds to a viewer who is looking at the lenticular element (2) under a small viewing angle. The focal point of this lenticular element (2) coincides with the plane of the pixelated display panel (8), but is longer than the lenticular thickness (9) because the light travels a longer distance from the pixelated display panel (8) to the lens (1).

In principle, any subsequent element may have a gradually different focal length when moving from the edges to the center of the lenticular lens. Usually, however, the elements that are close to the central line do not have a gradient in the focal length, or at least not a significant gradient, because the angles under which they are viewed lie still close to the normal to the lenticular lens.

Thus, in a lenticular lens according to the disclosure, the gradual decrease of the focal length may be present in only a part of the distance from the first edge of the array to the central line and in only a part of the distance from the second edge of the array to the central line. In such case, the gradual decrease is highest at each of the edges and reaches zero at a particular lenticular element that is present between the respective end and the central line (between that particular element and the central line, there is then no gradient in focal length). The lenticular element that forms the border between the presence and the absence of a gradient may be located at a distance from the respective edge of between 5 and 75% of the distance from the respective edge to the central line, in particular between 10 and 50%, more in particular between 15 and 40%.

Usually, each elongate lenticular element as such has a focal length that is constant over its entire length. In particular cases, however, the lenticular elements, independently of one another, may have a focal length that gradually decreases or increases from the ends of the lenticular elements towards their middle. The advantage of such gradient is also an improved angular performance of the lenticular lens. Moreover, it provides a reduction of the visibility of the black matrix under different angles, leading to less moiré effects.

There are different ways to achieve the gradual decrease of the focal length from the first edge of the array towards the central line and from the second edge of the array towards the central line. It may for example be the result of a gradient in the refractive index of subsequent lenticular elements, i.e. subsequent elements have a different refractive index. The extremities between which the refractive index varies in a gradual manner may be expressed by the ratio of both extremities. For example, the ratio of the refractive index of a lenticular element at an edge of the array and the refractive index of a lenticular element at the central line of the array is in the range of 0.50 to 0.99. The ratio is in particular in the range of 0.65 to 0.97, more in particular in the range of 0.75 to 0.95.

Figure 3:
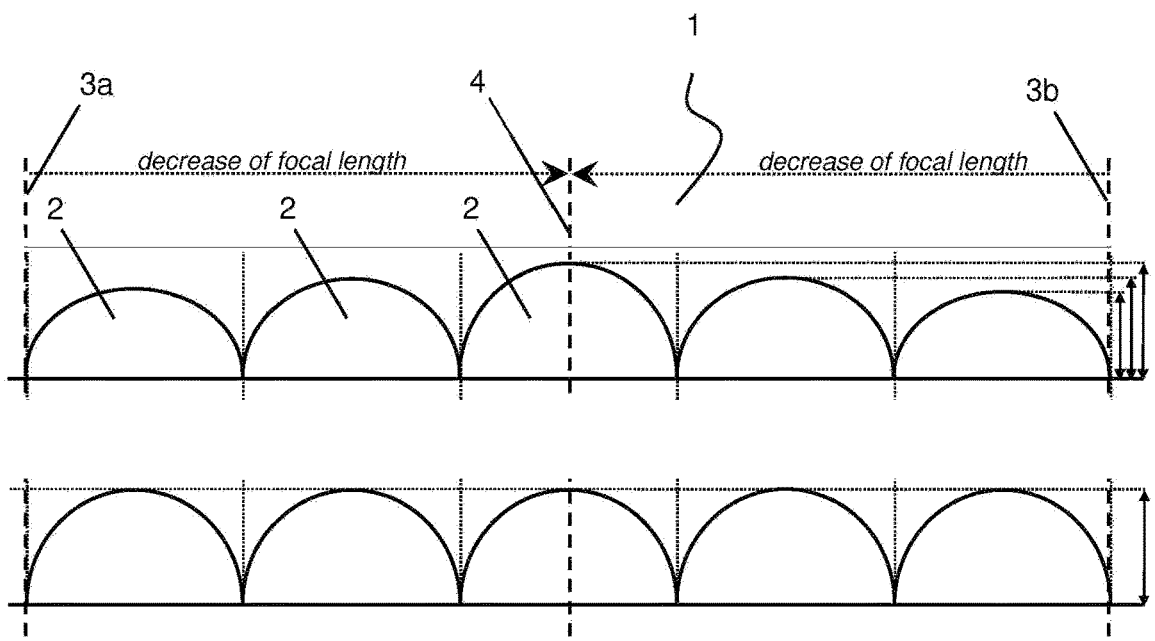
FIG. 3 is a cross-sectional view of a lenticular lens in accordance with the disclosure, which has a gradient in the curvature of the lenticular elements.

The gradual decrease of the focal length may also be the result of a gradient in the curvature of subsequent lenticular elements, i.e. subsequent elements have a different shape. This is illustrated in the cross-sectional view of FIG. 3, displaying a conventional lenticular lens (bottom picture) and a lenticular lens (1) according to the disclosure (top picture). The lenticular lens (1) according to the disclosure comprises an array of elongate lenticular elements (2). The array has a first edge (3a) and a second edge (3b), between which all the elongate lenticular elements (2) are present. A central line (4) is present in the array, which is centered between the first edge (3a) and the second edge (3b) of the array. FIG. 3 demonstrates that in a lenticular lens (1) according to the disclosure, the height of subsequent lenticular elements (2) decreases from the central line (4) towards the edges (3a, 3b). As a result, the focal length of subsequent lenticular elements (2) decreases from the edges (3a, 3b) of the lenticular lens (1) towards its central line (4). In contrast, the lenticular elements in the conventional lenticular lens have equal heights and therefore no gradient in focal length is present in such lens.

Yet another method to achieve the gradient in focal length concerns the application of a layer of a different material onto a conventional lenticular lens (i.e. one wherein each lenticular element has the same focal length). The layer is then applied with a thickness that varies from one lenticular element to another. In this way, a gradual decrease or increase of the thickness can be implemented for each subsequent lenticular element, i.e. from the element at the first edge of the array towards the central line as well as from the element at the second edge of the array towards the central line. Such layer may have a refractive index that is different from that of the lenticular lens and so generate a gradient in the focal length.

Thus, in a lenticular lens of the disclosure, the lenticular elements may comprise lenticular support elements that are covered with a layer of a second material that has a refractive index that is different from that of the lenticular support elements, wherein the thickness of the layer gradually decreases or increases for each subsequent lenticular element from the first edge of the array towards the central line as well as from the second edge of the array towards the central line.

This function of an additional layer on the lenticular lens may be combined with another function of such layer, which is the function of aligning liquid crystal molecules in a liquid crystal composition. The material of the layer may therefore also have liquid crystal alignment properties. For example, the material is a polyimide.

Alternatively, a layer with a thickness that varies for different lenticular elements may be of the same material as the lenticular lens and solely function as a modifier of the lens curvature. Such material may e.g. be printed on top of the lenticular surface of the lenticular lens, to thereby yield a lenticular surface with a gradient in curvature of the lenticular elements.

The disclosure further relates to an autostereoscopic display device comprising
  a display panel having an array of display pixel elements for producing a display output; and
  a lenticular lens as described hereinabove which is provided over the display panel in a way wherein it can transmit the display output;
  wherein the autostereoscopic display device has a lenticular thickness that is defined as the distance between the apex of the lenticular elements and the pixels of the display panel (i.e. measured perpendicular to the elements and the display panel).

Usually, the lenticular lens in such display device is of a rectangular shape (including a square shape), but a shape with a curved third edge and a curved fourth edge is in principle also possible. In any case, however, it is preferred that the direction of the lenticular elements is such that viewing of the display by a viewer occurs with the lenticular elements extending perpendicular to the imaginative line that connects both eyes of a viewer. The reason for this is that the gradual change of the focal length of subsequent lenticular elements is preferably equal in all mutually opposite directions from the center of the display. A viewer that is centered to the display then experiences from e.g. each corner of the display the same gradual change in focal length and thus the same image quality. For a display device that is oriented in vertical position to suit a viewer that is also in a vertical position (or is at least in a position wherein the imaginative line that connects both viewer's eyes is horizontal), this requires that the lenticular elements are directed vertically when the device is viewed at, and are not slanted (although columns of pixels may indeed be slanted with respect to the vertical lenticular elements).

A lenticular element has an apex, which is the highest point of the lenticular element relative to the base of the lenticular lens in case the lens is of a convex shape. Conversely, the apex is the lowest point of the lenticular element in case the lens is of a concave shape. Given the elongated nature of the lenticular elements, the apex is in fact a line that extends in the longitudinal direction of the lenticular element.

In an autostereoscopic display device of the disclosure, the presence of the lenticular lens over the display panel inherently has the effect that the apex of the lenticular elements is at a certain distance from the pixels of the display panel. This distance may be considered as the thickness of the packing that is present on the pixels, wherein at least part of this packing is formed by the lenticular lens. For the purpose of the disclosure, this distance is characterized as the "lenticular thickness". This is illustrated in FIG. 2.

When the viewing angle is large (i.e. there is only a small deviation from the normal to the display), the focal length of the lenticulars is ideally equal to the lenticular thickness. At smaller viewing angles, however, the focal length of the lenticulars has to be longer than the lenticular thickness, because the light travels a longer distance from the pixel to the apex than the lenticular thickness. This means that in such cases the focal point of the lenticular element has to fall behind the plane of the pixels to compensate for the longer travel distance. This is illustrated by the curve that crosses the display panel in FIG. 2; it falls behind the display panel for large viewing angles, and coincides with the display panel at a smaller viewing angle.

It is hard to make general statements about the absolute values for ranges wherein the focal length gradually decreases, because they are highly dependent on the design parameters of the autostereoscopic display device in which the lenticular lens is incorporated. In a relative manner, however, it can be stated that the shortest focal length in the array (which is present at its central line) equals the lenticular thickness, and that the longest focal length in the array (which is present at its edges) is at least 1.05 times the lenticular thickness, for example at least 1.10 times, at least 1.20 times, at least 1.30 times, at least 1.40 times or at least 1.50 times the lenticular thickness. Usually, it is in the range of 1.1-1.6 times the lenticular thickness, in particular it is in the range of 1.2-1.5 times the lenticular thickness.

The disclosure further relates to a method for the manufacture of a lenticular lens, comprising
  filling a lenticular mold with a heat-curable composition; then
  curing the composition to form the lenticular lens;
  characterized in that the curing is performed by applying a temperature gradient, in particular a temperature gradient from the first edge of the array towards the central line as well as from the second edge of the array towards the central line.

The disclosure further relates to a method for the manufacture of a lenticular lens comprising an array of elongate lenticular elements extending parallel to one another, the array comprising a first edge and a second edge extending parallel to the elongate lenticular elements and a central line that is centered between the first edge and the second edge, the method comprising providing a non-gradient lenticular lens wherein the lenticular elements have equal focal lengths; then changing the curvature of the lenticular elements by adding a layer of a certain material on top of the lenticular elements, wherein the material is the same as the material of the non-gradient lenticular lens.

The disclosure further relates to a method for the manufacture of a lenticular lens comprising an array of elongate lenticular elements extending parallel to one another, the array comprising a first edge and a second edge extending parallel to the elongate lenticular elements and a central line that is centered between the first edge and the second edge, the method comprising providing a non-gradient lenticular lens wherein the lenticular elements have equal focal lengths; then changing the curvature of the lenticular elements by removing part of the surface of the non-gradient lenticular lens.

What is claimed is:

1. A lenticular lens comprising an array of elongate lenticular elements extending parallel to one another, the array comprising
   a first edge and a second edge extending parallel to the elongate lenticular elements;
   a central line that is centered between the first edge and the second edge:
   wherein the elongate lenticular elements have
   a length, which is the distance between their two ends;
   a middle, which is centered between the two ends;
   a focal length, which allows the elongate lenticular elements to converge or diverge light;
   characterized in that
   the focal length of the elongate lenticular elements gradually decreases from the first edge of the array towards the central line as well as from the second edge of the array towards the central line;
   a method for the manufacture of the lenticular lens comprising
      providing a non-gradient lenticular lens wherein the elongate lenticular elements have equal focal lengths; then
      changing the curvature of the elongate lenticular elements by adding a layer of a certain material on top of the elongate lenticular elements, wherein the material is the same as the material of the non-gradient lenticular lens;
   or
   a method for the manufacture of the lenticular lens comprising
      providing a non-gradient lenticular lens wherein the elongate lenticular elements have equal focal lengths; then
      changing the curvature of the elongate lenticular elements by removing part of the surface of the non-gradient lenticular lens.

2. The lenticular lens according to claim 1, wherein the gradual decrease of the focal length is present in a part of the distance from the first edge of the array to the central line and in a part of the distance from the second edge of the array to the central line, wherein the gradual decrease is highest at each of the edges and reaches zero at a lenticular element that is present at a distance from the respective edge of between 10 and 60% of the distance from the respective edge to the central line.

3. The lenticular lens according to claim 2, wherein the gradual decrease of the focal length from the edges of the array towards the central line is the result of a gradient in the refractive index of subsequent lenticular elements.

4. The lenticular lens according to claim 3, wherein the ratio of the refractive index of a lenticular element at an edge of the array and the refractive index of a lenticular element at the central line of the array is in the range of 0.65-0.99.

5. The lenticular lens according to claim 2, wherein the gradual decrease of the focal length from the edges of the array towards the central line is the result of a gradient in the curvature of subsequent lenticular elements.

6. The lenticular lens according to claim 1, wherein the gradual decrease of the focal length from the edges of the array towards the central line is the result of a gradient in the refractive index of subsequent lenticular elements.

7. The lenticular lens according to claim 6, wherein the ratio of the refractive index of a lenticular element at an edge of the array and the refractive index of a lenticular element at the central line of the array is in the range of 0.65-0.99 in.

8. The lenticular lens according to claim 1, wherein the gradual decrease of the focal length from the edges of the array towards the central line is the result of a gradient in the curvature of subsequent lenticular elements.

9. The lenticular lens according to claim 1, wherein the elongate lenticular elements have a focal length that is constant over the length of the elongate lenticular elements.

10. The lenticular lens according to claim 1, wherein the elongate lenticular elements, independently of one another, have a focal length that gradually decreases from the ends of the elongate lenticular elements towards their middle.

11. An autostereoscopic display device comprising
    the lenticular lens according to claim 1;
    wherein the autostereoscopic display device has a lenticular thickness that is defined as the distance between the apex of the elongate lenticular elements and the display pixel elements of the display panel.

12. The autostereoscopic display device according to claim 11, wherein
    the shortest focal length of the elongate lenticular elements in the array equals the lenticular thickness; and
    the longest focal length of the elongate lenticular elements in the array is in the range of 1.1-1.5 times the lenticular thickness.

* * * * *